Fig. 2

Jan. 1, 1952    J. KOLBE    2,581,030
STEERING CONTROL FOR BANKING ARM VEHICLES
Filed Jan. 5, 1948    6 Sheets-Sheet 3

INVENTOR
Joachim Kolbe
By Elwin A. Andrus
Attorney

Jan. 1, 1952          J. KOLBE          2,581,030

STEERING CONTROL FOR BANKING ARM VEHICLES

Filed Jan. 5, 1948          6 Sheets-Sheet 5

INVENTOR
Joachim Kolbe

Jan. 1, 1952  J. KOLBE  2,581,030
STEERING CONTROL FOR BANKING ARM VEHICLES
Filed Jan. 5, 1948  6 Sheets-Sheet 6

INVENTOR
Joachim Kolbe
BY
Attorney

Patented Jan. 1, 1952

2,581,030

UNITED STATES PATENT OFFICE 2,581,030

STEERING CONTROL FOR BANKING ARM VEHICLES

Joachim Kolbe, Sussex, Wis.

Application January 5, 1948, Serial No. 630
In Canada January 17, 1947

30 Claims. (Cl. 280—87)

This invention relates to steering mechanism for vehicles having the superstructure supported by banking arms for inward banking on turns.

This application constitutes a continuation in part of copending applications Serial No. 724,062, filed January 24, 1947, now Patent No. 2,576,686, granted November 27, 1951; Serial No. 742,496, filed April 19, 1947; Serial No. 771,717, filed September 2, 1947; Serial No. 787,499, filed November 22, 1947; Serial No. 642,263, filed January 19, 1946, now abandoned; Serial No. 641,707, filed January 17, 1946, now abandoned; and Serial No. 642,264, filed January 19, 1946, now abandoned.

The invention is directed to the problem of steering the wheels without interference from the movement of the superstructure during banking, or from the movement of the wheels in vertical oscillation. In such movements, as described in the several copending applications referred to above, the steering arm ball joint moves relative to the superstructure in a resultant path governed between a substantially vertical line when only oscillation is involved and a circular line having the corresponding banking axis as its center when only banking is involved.

Where rigid axles are employed this resultant path for the steering arm ball joint for the wheel being steered in the first instance is influenced by the action of both banking arms, depending upon the spacing of the ball joint from the outer pivotal joint between the corresponding banking arm and the axle. This latter influence should be kept at a minimum by locating the steering arm ball joint close to the pivotal joint between the corresponding arm and the axle, so that the ball joint may be said to move about the banking axis substantially the same as though it were rigidly secured to a part of the banking arm.

The invention is based upon the discovery that the problem of steering can be solved by using a substantially horizontal drag link for operating the steering arm and locating the opposite end of the drag link in a neutral position relative to the movements involved in the suspension. The simplicity of the solution corresponds to the simplification introduced in banking suspensions by the use of banking arms with inclined banking axes as set forth in applications Serial No. 724,062 and No. 742,496, referred to above.

The term "banking arm" as employed in the above copending applications and herein refers to that part of the supporting structure of a counter banking vehicle constituting one of at least a pair of interconnected supports between the superstructure and either the road or a rigid axle, comprising a universally movable joint at one end guided in its banking movement relative to the opposite end of the arm structure in effect by an inclined hinge at said opposite end to thereby move along a predetermined path whereby the plane of the arm containing the center of the universally movable joint and the inclined hinge axis intersects the median vertical longitudinal plane of the superstructure in static position in a line passing substantially above the center of gravity of that part of the superstructure supported by said pair of supports at the point of intersection of the line with a transverse vertical plane containing the universally movable joints of the pair of supports, said banking arm structure constituting also the vertical oscillation mechanism for guiding the superstructure for vertical oscillation upon the road or rigid axle, and said universally movable joint being furnished by the tire to road contact in the case of an independent wheel suspension.

The invention is applicable to the control of the driving position of each wheel at all times, solely where the wheel is free to change its direction by turning about a substantially vertical axis, such as a kingpin, either for the purpose of steering or for the purpose of maintaining the wheel in a straight ahead position during swinging movement of the banking arm relative to the superstructure, the latter being termed "block steering."

The principal object of the invention is to provide a banking arm suspension in which the control of the driving position of the wheels in direction is maintained without substantial interference from the vertical oscillation and banking movements of the suspension.

Another object is to provide such a construction applicable to various designs and embodiments of banking arm suspensions and wherein the connections between the superstructure and the steering control arms of the corresponding wheels may be located favorably with respect to space requirements.

Another object is to provide such a construction applicable to banking arms embodying caster and camber control and in which the influence of such control upon the relative movement between the superstructure and the steering control arm ball joint is substantially compensated for to avoid sub-steering thereby.

Another object is to provide a control of the wheel direction for banking arm suspensions having fully independent oscillation of the wheels, and for both steerable and block steered wheels.

Another object is to greatly simplify the connection between the superstructure and the steering control arm for the wheel, eliminating complicated compensating links, and employing substantially only a single drag link member, whereby substantial gains are made in space requirements, weight and cost.

Another object is to provide a construction in which the steering gear and its connections to the steering control arms of the steerable wheels can be disposed low down relative to the road, thereby lowering the center of gravity of the superstructure and providing more favorable space for the steering mechanism.

Another object is to provide for automatic control of the directional turn of the wheel relative to the suspension members during banking movement of the superstructure to compensate for loss of directional position of the wheel caused by such movement.

Another object is to provide a method of accurately locating the neutral point for steering control with the help of descriptive geometry.

Another object is to provide a substantial variation in design for the location of the steering gear on the superstructure independent of the position for the neutral point for steering control.

Another object is to provide for the transference of steering control from the steering control arm of one wheel to that of the opposite wheel for a pair of banking arm suspensions, as by the use of a steering tie rod.

A still further object of the invention is to provide a simple steering mechanism for a vehicle with a superstructure arrangement wherein hinges inclined toward the median plane of the car and toward the front and rear thereof are interposed between the wheel supporting and guiding means and the superstructure in such a manner that the superstructure is free to shift laterally and assume an angularly inclined position toward the inside of the curve.

Another object of the invention is to arrange a steering mechanism for a banking device vehicle wherein the running rear for each wheel moves around a hinge axis which is inclined toward the wheel and toward the median plane of the vehicle.

Another object is to provide a more accurate control of the steering at all times.

The accompanying drawings illustrate various embodiments of the invention and the manner of designing the same to fulfill the objects referred to.

The vehicle may be any banking vehicle wherein at least one pair of wheels have individual substantially vertical kingpins providing for a steering or directional control of the same.

Figures 8, 9:
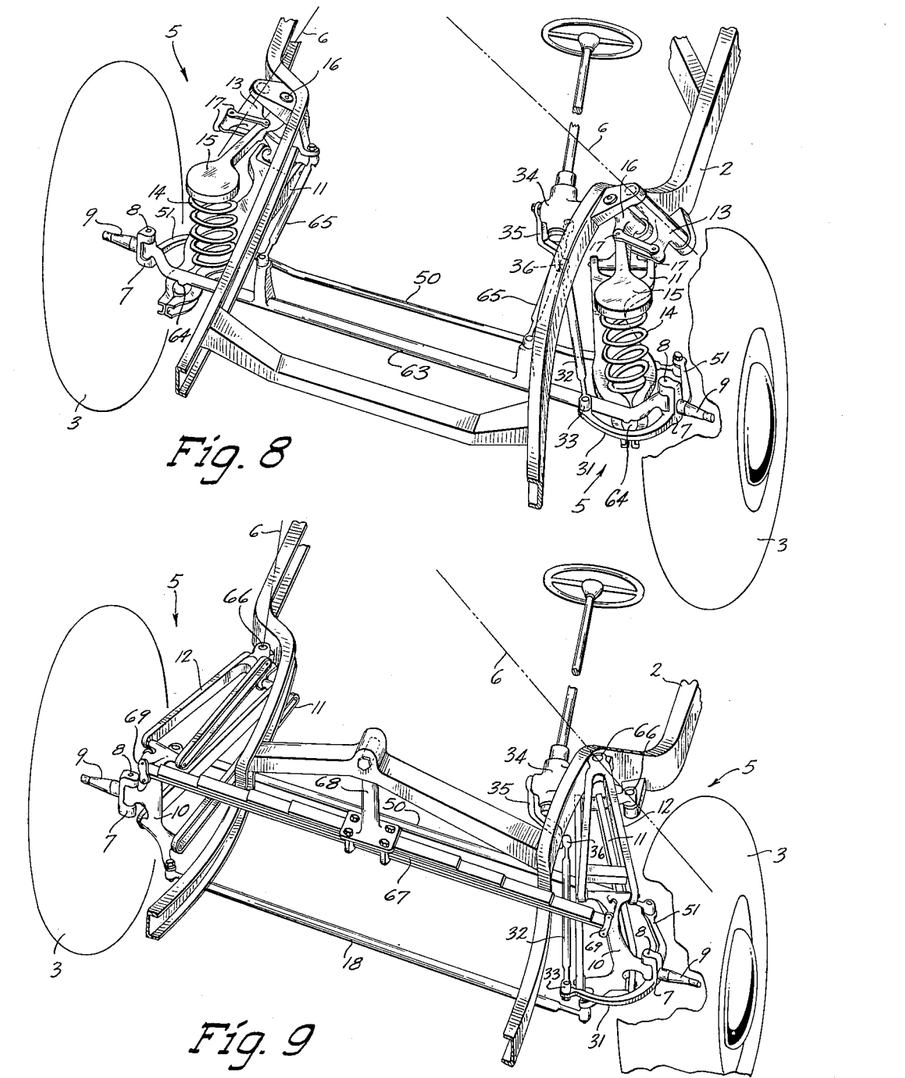
Fig. 8 is a similar view of an embodiment of the invention employing a rigid axle.
Fig. 9 is a similar view of an embodiment of the invention employing a different form of banking arm.

The wheels may be suspended from the superstructure either by means of rigid axles or by independent suspensions. The drawings with the exception of Fig. 8, illustrate independent suspensions for both the front steerable wheels 3 and the rear drive wheels 4.

The drawings in general illustrate a vehicle of the passenger automobile type having a superstructure or body 1 shown in dotted outlines and represented more positively as the chassis frame 2 supported upon a pair of spaced front wheels 3 and a pair of spaced rear wheels 4.

Figure 1:
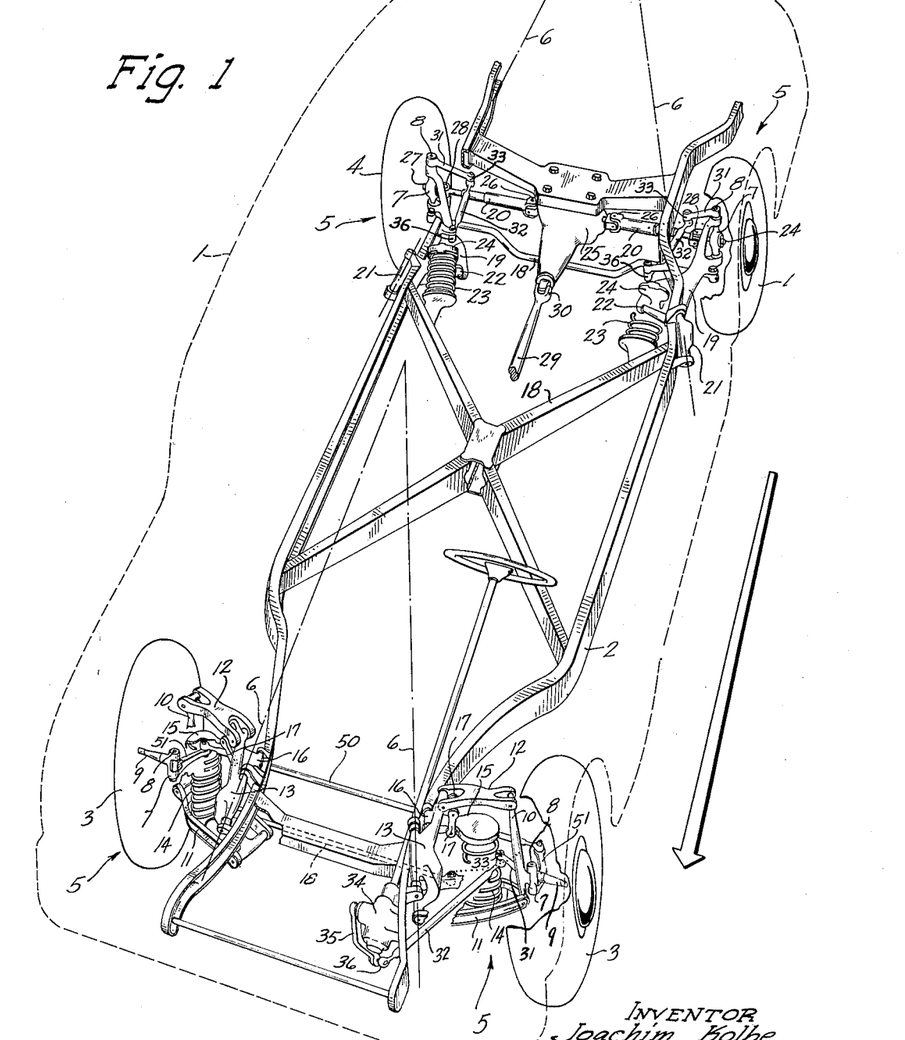
Figure 1 is a perspective view of a vehicle embodying the invention, and showing the superstructure in normal upright position.
Figure 2:
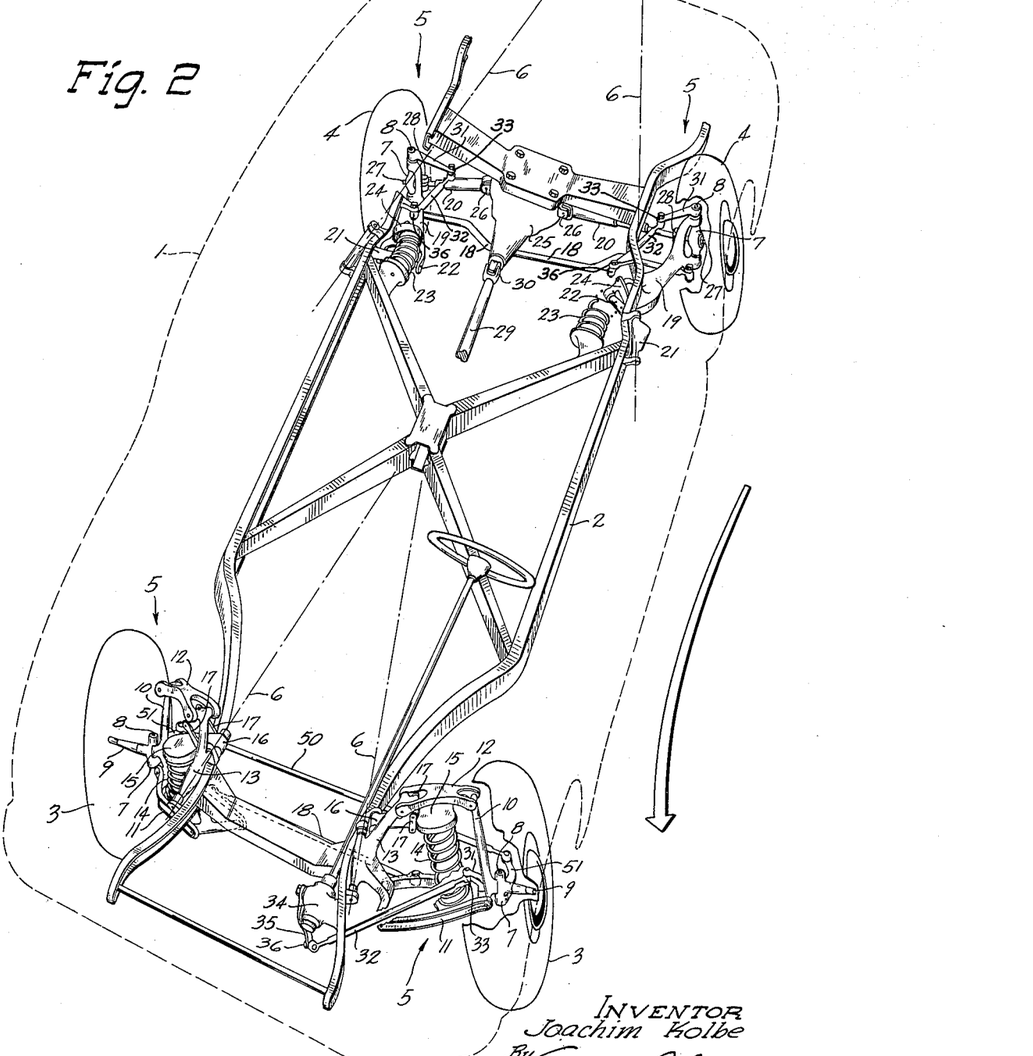
Fig. 2 is a similar view showing the superstructure in banked position as on a turn.

In the construction of Figs. 1 and 2 each wheel 3 constitutes the outer end of a banking arm 5, as set forth in copending application Serial No. 724,062, referred to. The banking arms 5 are disposed in pairs corresponding to the pairs of wheels and each arm is secured to the frame 2 by an inclined banking hinge 6.

The wheel knuckle 7 of each corresponding wheel is suspended by a vertical hinge or kingpin 8. The wheel knuckles 7 for the front wheels constitute the steering knuckles and are generally constructed integral with the corresponding wheel spindles 9. The wheel knuckles 7 for the rear wheels are preferably secured against steering, as described hereinafter.

Each banking arm 5 which contains a steerable front wheel 3 comprises a kingpin support 10 which is pivoted to a lower suspension arm 11 to turn during oscillation of the wheel on a substantially horizontal axis and to an upper suspension arm 12 to turn on a similar axis. The inner ends of the suspension arms 11 and 12 are pivoted to a banking hinge support member 13 so as to turn on substantially horizontal axes, as described in the copending application referred to above.

The coil spring 14 for each front banking arm is confined between the lower suspension arm 11 and a spring actuating lever 15 fulcrumed on the superstructure by pivotal joint 16 and which is connected to be actuated by the banking hinge support member 13 by means of a shackle 17 therebetween.

A suspension tie rod 18 interconnects, by means of ball and socket joints, the lower suspension arms 11 of the pair of banking arms.

Referring to the rear end construction of Figs. 1 and 2, the vertical hinge or kingpin 8 for each rear wheel is made in two bearing sections and the outer end of the suspension arm 19 of banking arm 5 is forked vertically to accommodate the drive shaft 20 for the wheel.

The suspension arm 19 for each rear banking arm 5 is connected to a banking hinge support member 21 by a substantially horizontal pivot 22 therebetween consituting the hinge for vertical oscillation of the wheel. A spring 23 is disposed between the superstructure and a bracket 24 extending vertically from the suspension arm 19, and is actuated by the vertical oscillation of the wheel effecting a turn about the hinge 22 and by lateral movement of the superstructure resulting from centrifugal forces on a curve and effecting a turn at the banking hinge 6 between the superstructure and hinge support member 21.

The drive for the rear wheels 4 is effected by the corresponding telescopic drive shafts 20 which extend thereto from opposite sides of the differential 25 which is rigidly attached to the frame 2. The inner end of each shaft 20 is connected to a corresponding drive member in the differential 25 by means of a universal joint 26. The outer end of each shaft 20 is connected to the drive spindle 27 of the corresponding wheel 4 by means of a universal joint 28. The drive spindle 27 for each rear wheel 4 is journaled in suitable bearings carried by the wheel knuckle 7.

A suspension tie rod 18 interconnects the outer ends of the suspension arms 19 by means of ball and socket joints between the tie rod and arms, and thereby secures constant distance between the rear banking arms 5.

The rear end construction illustrated, with the differential 25 attached rigidly to the superstructure is particularly adapted to rear engine vehicles, although it may be employed in front engine vehicles in which latter case the usual main drive shaft 29 will extend forwardly from the differential. Suitable universal joints 30 may be employed at opposite ends of shaft 29 to correct for misalignment and prevent vibration.

In carrying out the invention, means are provided for either steering or block steering the wheels. For this purpose at least one wheel knuckle 7 for each pair of banking arms 5 carries a steering arm 31 rigid therewith and which extends susbtantially transversely of the vehicle. Where only one of the wheel knuckles 7 for a pair of banking arms 5 is provided with a steering arm 31, as illustrated in the front end construction of Figs. 1 and 2, the wheel knuckles 7 should be tied together to operate in unison as described hereinafter. In the rear end construction of Figs. 1 and 2, each wheel knuckle 7 is provided with a steering arm 31.

The outer end of each steering arm 31 is connected to one end of a drag link 32 by means of a ball and socket joint 33.

The opposite end of the drag link 32 is connected to the superstructure 1 in a manner to provide the desired steering or block steering control for the wheel or wheels.

Steering control is obtained by connecting the drag link 32 to a suitable steering gear mechanism 34 carried by the superstructure and which operates the drag link through a pitman arm 35 and ball joint 36 between arm 35 and the drag link 32, as illustrated in the front end construction for Figs. 1 and 2. Block steering control is obtained by connecting the drag link 32 directly to the superstructure by means of the ball joint 36 illustrated in the rear end construction for Figs. 1 and 2.

In operation, both vertical oscillation of the wheels relative to the superstructure and banking of the superstructure relative to the effective road contact points for the banking arms have to be considered in their possible influence upon the established directional position of the wheels.

Vertical oscillation will not influence the steering so long as the drag link 32 is disposed with the ball joints 33 and 36 in substantially the same horizontal plane.

The influence of banking of the superstructure upon steering is not so readily solved due to the fact that the superstructure moves both laterally and to a tilted position during banking.

Particularly where the banking arm is attached to the superstructure to move relative thereto about an inclined banking axis that is not parallel to any of the three planes of the vehicle (the horizontal plane, vertical longitudinal plane, and vertical transverse plane) any part of the banking arm moves relative to all three planes during banking and this fact makes it difficult to determine how to prevent sub-steering of the wheels during banking.

The difficulty arises largely because of the fact that the wheel knuckle 7 and its corresponding wheel spindle 9 or 27 turn about the inclined banking hinge throughout the banking movement, and it is desired to turn them about the kingpin 8 to compensate for this first mentioned turn so that the desirable directional position for the spindle in plan view is maintained substantially without influence from the banking movement.

The importance of compensating for the influence of the banking movement upon the directional position of the wheel will be appreciated from the fact that, although on high speed turns the amount of manual turning of the wheel in direction for steering may be of the order of about one degree, more or less, the turn of the wheel in direction in plan view on account of the banking movement referred to may exceed this amount several times and may either increase or decrease the overall steering effect obtained. Such an influence in steering cannot be tolerated for safe operation.

The present invention is based upon the discovery that the ball joint connection 36 for drag link 32 may be employed as a control point for correcting the turn of the spindle about its kingpin axis resulting from banking, and that if the control point 36 is located along what may be called a neutral steer axis for the given banking arm construction it will eliminate sub-steering within safe limits for banking at parking speeds.

Figures 3, 5:
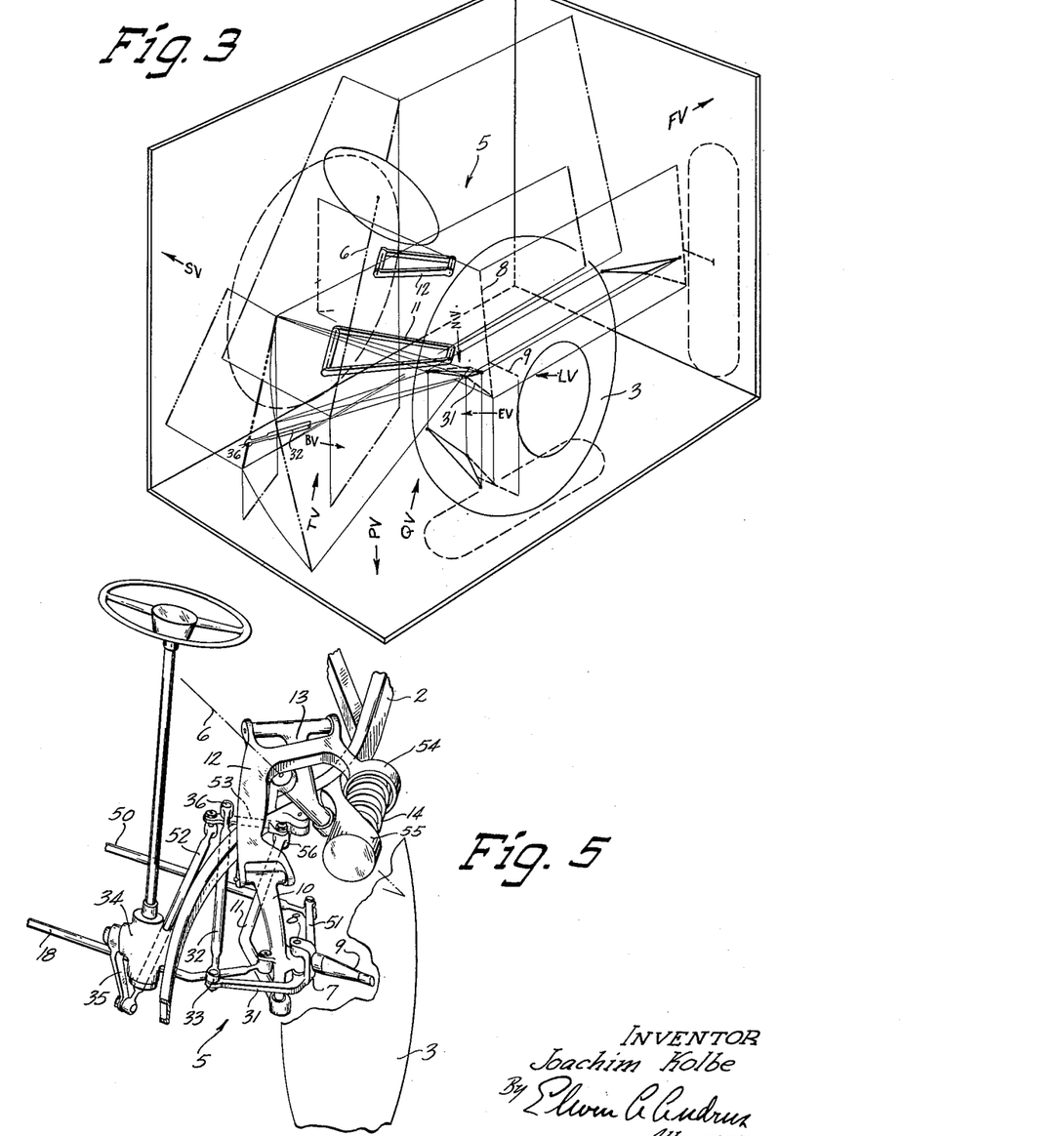
Fig. 3 is a perspective composite layout illustrating the several planes in which geometric views are taken for determining the construction during designing of the same.
Fig. 5 is a detail perspective view of a single banking arm mounting showing a modified construction of steering mechanism with the steering gear disposed at a substantial distance from the neutral point.
Figure 4:
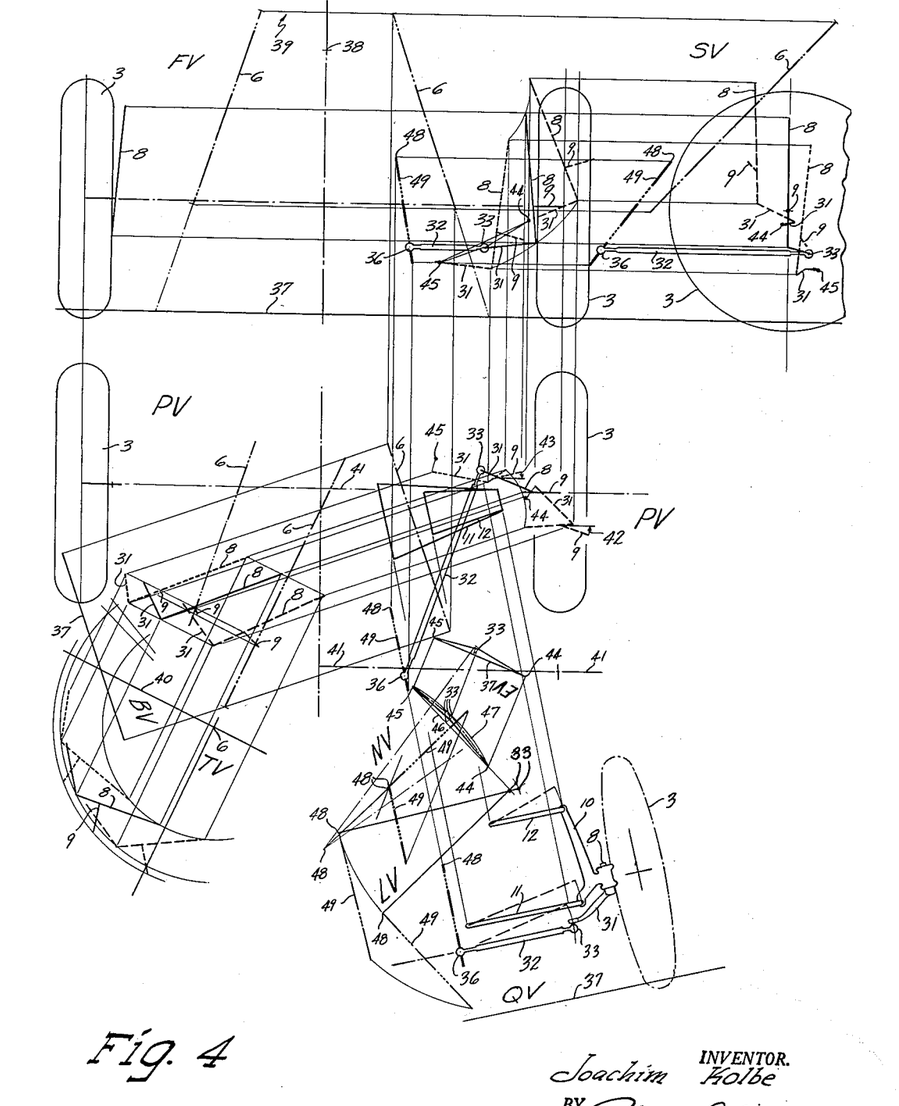
Fig. 4 is a geometrical layout in the several planes indicated in Fig. 3, for a front banking arm and steering mechanism of the general type of Fig. 1, shown in normal and extreme banked positions, and showing the developement for the location of the neutral point for steering control.

The neutral steer axis for any banking arm construction can be located by the help of descriptive geometry as illustrated in Figs. 3 and 4 where the left front banking arm and drag link of Fig. 1 are depicted in various geometric views and projected in both normal straight ahead position and extreme positions of banking.

Fig. 3 discloses in a perspective layout the location of the planes used for the development of the control point position as shown in Fig. 4. Fig. 3 shows diagrammatically the left front wheel 3, the kingpin axis line 8, spindle 9, steering arm 31, banking hinge line 6, lower and upper suspension arms 11 and 12, respectively, drag link 32 and control point location 36.

The planes which form the basis for Fig. 4 are indicated and more clearly defined by arrows which give the directions of view towards them. These views have been given the following initials and identifications:

FV—front view.
SV—side view.
PV—plan view.
BV—(banking hinge line view), a view perpendicular to a plane containing the projection of the banking hinge line in PV and the banking hinge line itself in its true length.

TV—(turn view), a view along the banking hinge line and employed in Fig. 4 to show the turn of the wheel steering mechanism about the banking hinge in its true angular movement.

EV—(extreme positions view), a view perpendicular to a plane, containing the projection in PV of the line connecting the two extreme banking position points of the steering arm ball joint 33 after their adjustment turns for keeping the wheels in a straight ahead position during banking and the true position of said line above that projection.

NV—(normal view), a view perpendicular to a plane containing the triangle formed by the normal position of the steering arm ball joint 33 and its two extreme banking positions after the adjustment turns about the kingpin, showing that triangle in its true size.

LV—(line view), a view along the line connecting the two extreme points of the steering arm ball joint 33 as described under EV. This view, therefore, is perpendicular to NV.

QV—(quadrangle view), a view parallel to the oscillation hinges and showing the suspension arm quadrangle in true front elevation.

In making the geometrical layout of Fig. 4 it is assumed that the superstructure remains fixed at all times and that the banking arm 5 belonging to the left front wheel 3 is rotated about its corresponding banking hinge axis 6 through the angular movement that would take place in banking of the superstructure on a turn, both for the curve inside and for the curve outside. The right front wheel is shown in FV (front view) and in PV (plan view). The kingpin axis 8 with spindle axis 9 and steering arm 31 are first shown in their normal position in FV, PV, and SV.

The road is represented by line 37. The superstructure is represented by point 38, which is located approximately at the center of gravity of the superstructure. The banking hinges are represented by the axes 6 inclined with respect to the road 37 and which extend upwardly and inwardly toward each other and may be said to meet at the center of motion 39 which during normal straight ahead travel is located vertically above the center of gravity 38 when the superstructure is evenly loaded, as more fully described in application Serial No. 724,062, referred to above.

After developing the normal position for the parts as described above, these parts are projected into BV, a view perpendicular to a plane containing the projection of the banking hinge line 6 in PV and the banking hinge line itself in its true length. The projection of the banking hinge line 6 thereby becomes the road line 37 for this particular view. The banking hinge line 6 and the parts 8, 9 and 31 are located along the projection lines extending from PV and perpendicularly to said newly established road line 37 and above the road line in the same height as they appear in FV. From here the parts 8, 9 and 31 are projected into TV, a view along the banking hinge line 6 and employed to show the turn of the kingpin 8, spindle 9 and steering arm 31 about the banking hinge in their true angular movements. The radii for each of the points defining the parts 8, 9 and 31 are obtained by computation from PV and BV, the radius for any one point being equal to the hypotenuses of a right angle triangle having as one leg the difference between the height of the point from the road in BV and the height of the true turning point therefor on the banking hinge axis 6, and as the other leg the distance between the particular point and its true turning point on the banking hinge line 6 in PV.

The turn of the banking arm and therewith of parts 8, 9 and 31 about the banking axis 6, which latter in TV appears as a point only, is determined by known factors such as the forces, leverages, and spring resistances involved and the desired amount of banking to be obtained. The turn on the curve outside may be different from the turn for the opposite banking arm on the curve inside for the same road curve, mostly depending upon the length and location of the suspension tie rod 18.

The two dotted or banked positions for parts 8, 9 and 31 are then projected back into BV and from there to PV, FV and SV, in the order named.

Each point is located in BV for its two extremes of banked positions on the respective projection line from TV drawn parallel to banking axis 6, as appearing in BV where it intersects the line drawn at right angles to the banking axis 6 from the true turning point on the axis for the point to be located.

The dotted positions for parts 8, 9 and 31 in PV are determined upon the projection lines drawn perpendicular to banking axis line 6 as appearing in PV by measuring the distance for each point from the vertical plane of the banking hinge axis 6 as established by line 40 in TV extending from axis point 6 at right angles to the projection of the axis as appearing in BV. Then the distance of each point from banking axis 6 in PV will be equal to the distance of the same point from line 40 in TV.

After establishing the dotted line positions of parts 8, 9 and 31 in PV, projection lines are drawn upwardly to FV and the points to be established for the respective banked positions are located by measuring the height of those points above the road line as shown in BV.

Projection lines are then drawn from the respective points as appearing in FV towards SV, and the points are established in SV at the respective distances from the line 41 representing the vertical plane of the wheel axis either forwardly or backwardly therefrom as the corresponding points in PV.

The layout views of Fig. 4 are predicated upon a substantially straight ahead direction for the wheels at all times and assume an extreme banking turn for the banking arm as where some outside force such as wind pressure or side hill operation moves the superstructure into a banked position or where only a very slight turn of the wheels in direction at very high speeds effects banking of the superstructure. These layouts therefore show the problem of maintaining the straight ahead direction for the wheels under conditions wherein a turn of the banking arm relative to the superstructure results in a movement of the wheel in one extreme relatively away from the superstructure to correspond to a wheel on the inside of a road curve and in a movement of the wheel in the other extreme relatively toward the superstructure to correspond to a wheel on the outside of a road curve.

The dotted line or banked positions of parts 8, 9 and 31 as appearing in PV show that during the turn of the banking arm the spindle as represented by part 9 has turned out of its original position perpendicular to the longitudinal vertical plane of the superstructure and has moved forwardly on the curve inside and backwardly on the curve outside. The forward and backward movement is of no importance as far as steering of the vehicle is concerned. The loss of transverse position of the spindle is important because it would change the direction of the wheel.

For this reason a turn of the spindle about the kingpin has to be provided to compensate for the loss of direction of the wheel during banking. Arrows 42 and 43 indicate the amount and direction of turn of the spindle about kingpin axis 8 on the inside and outside of the curve, respectively, to maintain it in a directly transverse position. Since the steering arm 31 and spindle 9 are fixed relative to each other, points 44 and 45 give the position for the ball joint 33 located at the outer end of the steering arm 31 after turn of the spindle about the kingpin axis 8, on the curve inside and curve outside, respectively.

The change in angular position of the kingpin axis 8 will result in a slight modification in the arc representing the adjustment for the ball joint 33 to points 44 and 45 in PV, but since the modification merely changes the arc from one of a circle to one of an ellipse of almost circular character, there is no need to consider it in PV.

The change in angular position of the kingpin axis 8 should be considered in FV to establish the proper heights for points 44 and 45. Due to the more inclined position of the kingpin axis 8 relative to the road on the curve inside than on the curve outside, and to the larger adjustment in turn about the kingpin axis 8 on the curve inside, the point 33 moves farther downwardly during travel into position 44 on the curve inside than it does during travel into position 45 on the curve outside.

Once the normal position of the ball joint 33 at the end of the steering arm 31 and its positions 44 and 45 are established in PV and in FV, a point has to be found which maintains its distance from all three positions 44, 33 and 45, during the turn of the banking arm about its banking hinge. For practical reasons the positions of points 44, 33 and 45 have been re-drawn in Fig. 4 somewhat below the original positions as shown in PV and in their relation to a new wheel axis line 41 parallel to the original axis line 41 and of equal distance from the longitudinal vertical plane of the vehicle.

A new plane, EV, then has been established containing the projection of a line connecting point 44 with point 45, and containing the true length of that connecting line determined by measuring the height of those points relative to the road, as appearing in FV. Point 33 is projected into EV and its proper height relationship is taken from FV. In an effort to establish the true size of the triangle formed by points 44, 33 and 45, the true turning point of point 33 relative to the true length line 44—45 is established as point 46 and projected to the projection line of line 44—45 in EV and from there to the corresponding line in FV. The difference in height between points 46 and 33 in FV and the line connecting 46 and 33 in PV are drawn in the new PV to form a right-angle triangle, the hypotenuse of which gives the true distance of point 33 from the true length line between 44 and 45. This true distance is measured along the line connecting 46 with 33 in EV to establish NV which shows the triangle 44, 33 and 45 in full size.

It is now possible to find the center of a circular arc 47 established by points 44, 33 and 45 in NV. The intersection of the two perpendiculars erected from the centers of the lines 44—33 and 33—45, respectively, gives the desired center 48 of the circular arc referred to.

LV is then established as a view along true length line 44—45 of NV and containing point 48. Since LV is perpendicular to NV, it may be considered as a sectional view through the plane of NV. Points 44 and 45 are both located on the same line 44—45 and appear in LV as one point. The circular arc 47 referred to will appear as a straight line along an extension of the connecting line between said point 44—45 and point 48.

In LV it appears that all of the points 48, 44, 33 and 45 lie in the plane of NV. A line 49 drawn perpendicular to this plane at point 48 will represent the neutral steer axis since in space points 44, 33 and 45 are equally distant from any selected point along line 49.

The actual distance between any selected point along line 49 and the three points 44, 33 and 45 will depend upon the location for such selected point relative to point 48, and the greater the selected point is spaced along line 49 from point 48, the greater will be the distance of the selected point from points 44, 33 and 45.

In reality, since points 44, 33 and 45 represent the center of ball joint 33 in its neutral and extreme banked positions and it is desired to locate the control point 36 at some selected point along the neutral steer axis 49, the distance between such selected point on the axis 49 and point 33 will represent the length of the drag link 32.

Having located the neutral steer axis in LV relative to points 44, 33 and 45, in space, it now becomes necessary by further descriptive geometry to transpose the neutral steer axis 49 to PV, FV and SV.

For this purpose the neutral steer axis 49 must first be located in EV. To do this the point 33 in LV has to be turned downwardly around the line 44—45 represented by a point in LV to a position having the same distance from the plane NV as represented by line 48—33 in LV as point 33 appears from its true turning point on line 44—45 in EV. New line 48—33 is then established in LV using the new position for point 33, and neutral steer axis 49 is then drawn at right angles to the new line from point 48 to show its position after turning in LV from the plane of NV to a plane corresponding to EV.

The true turning point for point 48 is located on line 44—45 in EV by drawing a line from the point in NV to the true length line 44—45 appearing in NV and EV. This true turning point for 48 is the position for point 48 when looking at the plane of NV from a position at right angles to LV and looking along original line 48—33 in LV.

The position for point 48 after turning LV is transposed to EV by measuring its distance from the original plane 48—33 in LV and measuring a corresponding distance from line 44—45 in EV along the line from the true turning point of 48 towards point 48 as it appears in NV.

Any selected point along the neutral steer axis 49 of LV can be located in EV along the corresponding neutral steer axis line containing point 48 (just located) and its true turning point on line 44—45 by transposing the distance of the selected point in LV after turning from the plane represented by original line 48—33 in LV to a distance from line 44—45 in EV along the neutral steer axis in a corresponding direction.

Having thus established the neutral steer axis 49 in EV it is possible to locate the same in PV by first determining the projection line for point 48 which is perpendicular from line 44—45 in PV and which extends from point 48 in EV. The distance of point 48 from line 44—45 in PV along the projection line referred to corresponds to the distance from point 48 after turning LV to a line in LV drawn at right angles to original line 48—33 from the turning point 44—45.

A similar projection line can be drawn from any selected point on neutral steer axis 49 in EV perpendicular to line 44—45 in PV and the selected point located on the projection line in PV by the same process as referred to for point 48. The neutral steer axis 49 can be drawn in PV to contain the located point 48 and selected point.

From PV it is possible to project the neutral steer axis 49 to FV and locate the same by taking the heights out of EV. Axis 49 may then be projected to SV and located by taking the distances from the vertical plane 41 of the wheel axis line in PV. It will also be advisable to transfer the banking steer-axis 49 which has been developed in the separate PV drawing into its proper position in the original PV layout, as shown.

Fig. 4 furthermore contains the view QV, a view taken parallel to the oscillation hinges of the upper and lower suspension arms as shown in PV. The view QV is a front elevation view showing the true length of the suspension arms and disclosing the heights of those arms relative to the road. QV also shows the newly found neutral steer-axis 49 projected from PV and along which any point chosen for the control point 36 location will satisfy banking.

The drawing discloses that the control point 36 should be located at the intersection of the neutral steer-axis 49 and a plane parallel to the road in the height of point 33 as appearing in QV. This point of intersection can then be transferred into FV, SV and PV as the control point to be located according to this invention.

While the control point 36 here described as being located with the help of descriptive geometry may be located by empirical trial and error methods, the location should always be related to the location of point 33 in normal upright position and in its extreme banking positions.

The operation of the control point 36 through drag link 32 may be visualized as a partial parallelogram action. In plan view it is generally possible to develop a parallelogram between the points 36 and 33 and selected points along the kingpin axis 8 and banking hinge axis 6. When such a parallelogram is set up, the shifting of the steering arm 31 relative to the superstructure during banking will not materially change the direction of the steering arm in plan view.

Both front wheels 3 are steered in unison by means of a steering tie rod 50 connected to steering knuckle arms 51 on the respective wheel knuckles 7 by means of suitable ball and socket type joints.

The location of control point 36 for each rear banking arm 5 can be accomplished in the same manner as for the left front banking arm described above.

In each case the control point 36 is located to operate the drag link 32 during banking, in a manner to compensate for changes in wheel direction which would otherwise occur.

The invention is applicable to various types of banking arm constructions and to various locations for the steering gear 34.

In Fig. 5 the steering gear 34 is shown disposed transversely from the steering arm 31 making it necessary to employ an additional push and pull link 52 between the pitman arm 35 of the steering gear and the control point 36 for the drag link 32.

The link 52 is pivotally connected at its forward end to pitman arm 35 and at its rear end to one end of a transverse arm 53 which has its other end pivoted to the frame 2 of the superstructure.

The control point 36 in the construction of Fig. 5 represents the center of a ball joint between the rear end of drag link 32 and the arm 53 near the connection to the latter for the link 52.

The construction of Fig. 5 also differs from that of Figs. 1 and 2 in that the upper suspension arm 12 constitutes the main suspension arm with the spring 14 mounted directly between the spring actuating arm 54 thereon and a bracket 55 fixed to the superstructure. The lower suspension arm 11 constitutes principally a control arm for caster and camber of the kingpin 8 during banking as described in application Serial No. 787,499, referred to above. For this purpose the arm 11 is pivoted to the superstructure at a caster and camber control point 56 spaced from banking hinge axis 6, instead of being pivoted to the banking hinge support 13.

Figures 6, 7:
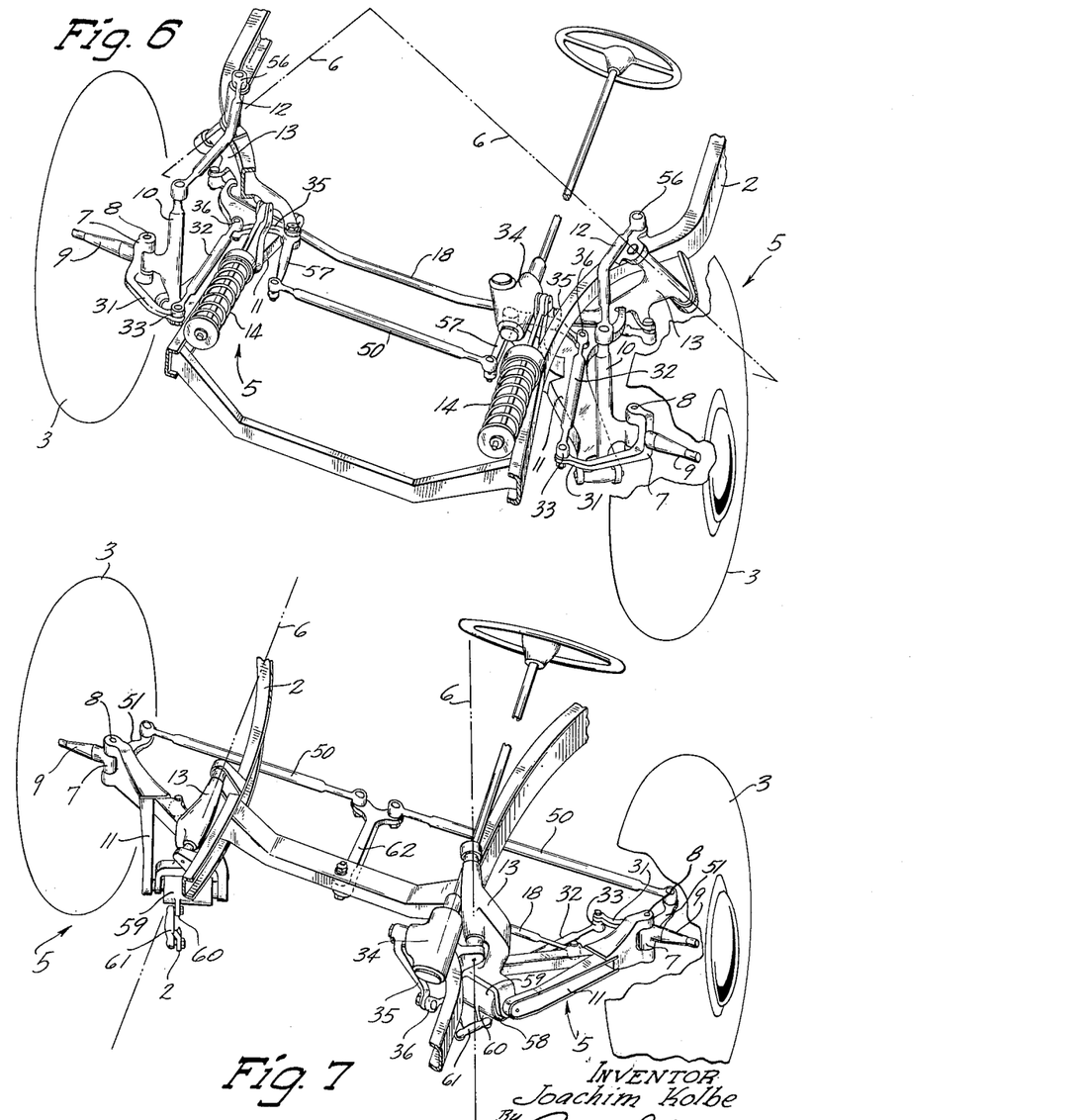
Fig. 6 is a detail perspective view of a front end construction showing fully independently suspended and fully independently steered wheels.
Fig. 7 is a similar view of a modified front end suspension employing a compensating steering tie rod.

In Fig. 6 the lower suspension arm 11 is the main suspension arm and upper arm 12 is a caster and camber control arm pivoted to the superstructure at 56.

The steering is effected in the construction of Fig. 6 by a separate drag link 32 and steering arm 31 for each banking arm.

The steering gear 34 operates a bell crank lever, one arm of which extends transversely and constitutes the pitman arm 35 pivoted directly to the left hand drag link 32 at control point 36 for the left hand banking arm 5.

The other arm 57 of the bell crank lever extends longitudinally and is linked to a corresponding arm 57 of a similar bell crank lever pivoted to the superstructure on the opposite side of the vehicle, by means of tie rod 50. The second bell crank lever referred to operates the right hand drag link 32 by means of a transverse lever arm 35 constituting a part of the bell crank and which is pivoted to the drag link at the control point 36 for the right hand banking arm 5. The steering control point connection 36 for each wheel is disposed between drag link 32 and the outer end of the transverse arm 35 of the corresponding bell crank lever. The steering tie rod 50 extends between the outer ends of the corresponding longitudinal arms 57 to effect simultaneously correlated operation of the two bell crank levers and steering control for both front wheels.

The suspension tie rod 18 in this construction connects the banking hinge support members 13, and since there is no other tie between the banking arms, and separate drag links 32 control the steering, the construction of Fig. 6 represents a fully independent wheel suspension system for the front end.

In Fig. 7 the two front banking arms are also fully independent. Each banking arm has only a single suspension arm 11 which may carry the kingpin 8 directly journaled in its outer bifurcated end. The construction illustrated also employs a simple rubber torsion spring 58 surrounding the oscillation hinge between arm 11 and support 13 and encased in an outer shell 59 having an arm 60 thereon. A shackle 61 connects arm 60 to the superstructure frame 2 for operating the spring 58 during banking.

The steering mechanism for Fig. 7 is substantially the same as that for Figs. 1 and 2, with the exception that the steering tie rod 50 is made in two sections each of which extends from one corresponding steering knuckle arm 51 to a central support lever 62. The lever 62 is pivoted at one end to a cross member of frame 2 to allow the opposite end to which tie rod sections 50 are attached to move in an arc during movement of the tie rod. The distance between the ball joint connections of the two sections of tie rod 50 to lever 62 is correlated to the length of lever 62 to obtain an adjustment in the total distance between the knuckle arms 51 during steering and during banking.

This construction provides a means for compensating for any possible transverse movement of one kingpin 8 relative to the other kingpin 8 during banking, whereby the overall length of tie rod 50 is adjusted to correspond to the changing distance between the kingpins as controlled and determined by the suspension tie rod 18. This is particularly important where the suspension tie rod 18 interconnects the banking hinge support members 13, and is of less importance where the suspension tie rod 18 interconnects the outer ends of the suspension arms 11 near the kingpins.

In Fig. 8 the front wheels are carried by a rigid axle 63 and are therefore outside the banking arms 5 which extend only from the banking hinges 6 to the ball and socket connections 64 between the lower suspension arm 11 and the axle. The axle 63 is held upright by an upper horizontal link 65 between an arm thereon and the superstructure 2.

The steering for the construction of Fig. 8 is substantially the same as that for Fig. 1 except for the fact that control point 36 must be located along a neutral steer axis for the combined front end movement of both banking arms and with regard to additional angular movement for the axle 63.

This construction has the advantage of locating the banking hinges 6 closer together to provide space for the turning of the wheels without substantially increasing the fore and aft movement of the wheels during banking.

The construction of Fig. 9 illustrates a different banking arm mechanism in which the banking hinge support 13 is eliminated and each of the suspension arms 11 and 12 is connected directly to the frame 2 by a ball and socket type joint 66, the two joints 66 being spaced along an inclined banking axis 6 similar to the banking hinge axis 6 for the other constructions illustrated. The construction of the banking arms is similar to that set forth in applicant's copending application Serial No. 638,210, now abandoned.

The construction of Fig. 9 employs a transverse leaf spring 67 disposed to provide a correlated action between the opposite ends thereof. The center of spring 67 is secured to a bracket 68 having a vertical arm pivoted to the frame 2 to provide for tilting of the center of the spring toward the outside of a curve as the superstructure moves outwardly and banks inwardly on the curve. This tilting movement of the center of the spring effects spring operation during banking as explained in copending application Serial No. 742,496, referred to above. The ends of the spring 67 are connected by shackles 69 to the corresponding kingpin supports 10.

The steering mechanism for the construction of Fig. 9 is substantially the same as for Fig. 1 except that the steering gear 34 is disposed to the rear from the transverse vertical plane 41 of the wheels as shown in Fig. 4 instead of forwardly therefrom.

In all of the embodiments of the present invention the important factor to be considered is the location for the steering control point 36 in each instance. Where such location is made by the help of descriptive geometry a neutral steering axis 49 is determined which gives a wide latitude in accommodating various space requirements by simply raising or lowering the points 33 and 36.

The location of the control point 36 is described as being at a point which is neutral both to vertical oscillation between the wheel and the superstructure and to relative movements between the wheel and superstructure during banking. This means that the control point operates to maintain the wheel spindle against angular movement in plan view so that it moves only in the same vertical plane or into planes parallel thereto during oscillation and banking movements. This is so for directional positions of the wheel near to the straight ahead driving position, and is sufficiently so for other more extreme directional positions of the wheel to maintain the steering control within safe limits.

The invention may have various embodiments within the scope of the accompanying claims.

I claim:

1. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, a steering arm for at least one of said wheel knuckles, a drag link interconnecting said steering arm and the superstructure, the connection between said drag link and superstructure being disposed at a control point which is substantially neutral to relative vertical oscillation between the wheel and the superstructure and to relative movement of the superstructure and the rotational axis for the wheel during banking whereby the directional position of the wheel is maintained, and a control mechanism for the opposite wheel knuckle of said pair correlated to said steering arm and drag link to provide a corresponding control for the steering position of the wheel during banking.

2. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, a steering arm for one of said wheel knuckles, a drag link interconnecting said steering arm and the superstructure, the connection between said drag link and superstructure being disposed at a control point which is substantially neutral to relative vertical oscillation between the wheel and the superstructure and to relative movement of the superstructure and the rotational axis for the wheel during banking whereby the directional position of the wheel is maintained, and a steering tie rod interconnecting corresponding arms on said wheel knuckles for said pair of wheels to provide unitary directional control of the wheels.

3. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, and a steering arm for each of said wheel knuckles, a drag link interconnecting each steering arm and the superstructure, the connection between each drag link and the superstructure being disposed at a control point which is substantially neutral to vertical oscillation of the corresponding wheel relative to the superstructure and to relative movement of the superstructure and the rotational axis for the wheel during banking whereby the directional position of the wheel is maintained.

4. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, a steering arm for at least one of said wheel knuckles, a drag link interconnecting said steering arm and the superstructure, the connection between said drag link and the superstructure being disposed at a selected position along a neutral steer axis for the banking arm which position is substantially neutral to vertical oscillation of the wheel relative to the superstructure whereby the directional position of the wheel is maintained substantially free from influence by both banking and oscillation and within safe limits at all times, and a control mechanism for the opposite wheel knuckle of said pair correlated to said steering arm and drag link to provide a corresponding control for the steering position of the wheel during banking.

5. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, a steering arm for one of said wheel knuckles, a drag link interconnecting said steering arm and the superstructure, the connection between said drag link and the superstructure being disposed at a selected position along a neutral steer axis for the banking arm which position is substantially neutral to vertical oscillation of the wheel relative to the superstructure whereby the directional position of the wheel is maintained substantially free from influence by both banking and oscillation and within safe limits at all times, and a steering tie rod interconnecting corresponding arms on said wheel knuckles for said pair of wheels to provide unitary directional control of the wheels.

6. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, and a steering arm for each of said wheel knuckles, a drag link interconnecting each steering arm and the superstructure, the connection between each drag link and the superstructure being disposed at a selected position along a neutral steer axis for the corresponding banking arm which position is substantially neutral to vertical oscillation of the wheel relative to the superstructure whereby the directional position of the wheel is maintained substantially free from influence by both banking and oscillation and within safe limits at all times.

7. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, a steering arm for at least one of said wheel knuckles, a drag link interconnecting said steering arm and the superstructure, the connection between said drag link and superstructure being disposed at a control point which is substantially neutral to relative vertical oscillation between the wheel and the superstructure and to relative movement of the superstructure and the rotational axis for the wheel during banking whereby the directional position of the wheel is maintained, means carried by the superstructure to adjust said control point for effecting steering of the wheel, and a control mechanism for the opposite wheel knuckle of said pair correlated to said steering arm and drag link to provide a corresponding control for the steering position of the wheel during banking.

8. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, a steering arm for one of said wheel knuckles, a drag link interconnecting said steering arm and the superstructure, the connection between said drag link and superstructure being disposed at a control point which is substantially neutral to relative vertical oscillation between the wheel and the superstructure and to relative movement of the superstructure and the rotational axis for the wheel during banking whereby the directional position of the wheel is maintained, means carried by the superstructure to adjust said control point for effecting steering of the wheel, and a steering tie rod interconnecting corresponding arms on said wheel knuckles for said pair of wheels to provide unitary directional control of the wheels.

9. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, a steering arm for each of said wheel knuckles, a drag link interconnecting each steering arm and the superstructure, the connection between each drag link and the superstructure being disposed at a control point which is substantially neutral to vertical oscillation of the corresponding wheel relative to the superstructure and to relative movement of the superstructure and the rotational axis for the wheel during banking whereby the directional position of the wheel is maintained, and means carried by the superstructure to adjust said control points for effecting steering of the wheels.

10. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, a steering arm for at least one of said wheel knuckles, a drag link interconnecting said steering arm and the superstructure, the connection between said drag link and superstructure being disposed at a control point which is substantially neutral to relative vertical oscillation between the wheel and the superstructure and to relative movement of the superstructure and the rotational axis for the wheel during banking whereby the directional position of the wheel is maintained, a steering gear carried by the superstructure and having a pitman arm connected to said drag link at said control point and constituting the superstructure connection for the drag link, and a control mechanism for the opposite wheel knuckle of said pair correlated to said steering arm and drag link to provide a corresponding control for the steering position of the wheel during banking.

11. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, a steering arm for one of said wheel knuckles, a drag link interconnecting said steering arm and the superstructure, the connection between said drag link and superstructure being disposed at a control point which is substantially neutral to relative vertical oscillation between the wheel and the superstructure and to relative movement of the superstructure and the rotational axis for the wheel during banking whereby the directional position of the wheel is maintained, a steering gear carried by the superstructure and having a pitman arm connected to said drag link at said control point and constituting the superstructure connection for the drag link, and a steering tie rod interconnecting corresponding arms on said wheel knuckles for said pair of wheels to provide unitary directional control of the wheels.

12. In a vehicle having a superstructure and a plurality of banking arms supporting said superstructure upon the road by means of corresponding wheels and interconnected transversely in pairs to operate in correlation for banking the superstructure inwardly on curves, each banking arm of at least one pair being connected to the superstructure on an inclined banking axis whereby the wheels have a forward and backward component of movement relative to the superstructure during banking movement of the superstructure, a steering control mechanism for said pair of said wheels comprising a wheel knuckle turnable on a substantially vertical axis for determining the direction for each corresponding wheel of the pair, a steering arm for each of said wheel knuckles, a drag link interconnecting each steering arm and the superstructure, the connection between each drag link and the superstructure being disposed at a control point which is substantially neutral to vertical oscillation of the corresponding wheel relative to the superstructure and to relative movement of the superstructure and the rotational axis for the wheel during banking whereby the directional position of the wheel is maintained, and means carried by the superstructure to adjust said control points for effecting steering of the wheels.

13. A vehicle comprising a superstructure, a plurality of pairs of transversely interconnected banking arms supporting said superstructure, at least one of said pairs of banking arms being connected to the superstructure on corresponding inclined banking axes whereby the wheels have a forward and backward component of movement relative to the superstructure during banking movement of the superstructure and including a pair of wheel supported spindles carried by vertically hinged wheel knuckles, a steering knuckle arm for each wheel knuckle, a transverse steering tie rod connecting said steering knuckle arms to maintain the directional control of the wheels in unison, a steering arm for one of said wheel knuckles, a steering gear carried by the superstructure and having a pitman arm, and a drag link connected to said steering arm and pitman arm by means of ball and socket joints to operate the steering arm under the control of the pitman arm, the drag link connection carried by the pitman arm being placed in space relative to the drag link connection carried by the steering arm, at a position determined in correlation to the relative movements of the two connections during vertical oscillation and during banking to maintain the spindles in their respective steer controlled directional positions at all times during such oscillation and banking.

14. A vehicle comprising a superstructure, a plurality of pairs of transversely interconnected banking arms supporting said superstructure, at least one of said pairs of banking arms being connected to the superstructure on corresponding inclined banking axes whereby the wheels have a forward and backward component of movement relative to the superstructure during banking movement of the superstructure and including a pair of wheel supported drive spindles carried by vertically hinged wheel knuckles, a steering arm for each of said wheel knuckles, and a drag link connecting each steering arm to the superstructure by means of ball and socket joints and disposed relative to the corresponding banking arm to provide a steering control for the drive spindle during operation of the banking arm, each drag link connection carried by the superstructure being placed in space relative to the corresponding drag link connection carried by the steering arm, at a position determined in correlation to the relative movements of the two connections during vertical oscillation and during banking to maintain the drive wheels in straight ahead directional position at all times.

15. A vehicle comprising a superstructure, a plurality of pairs of transversely interconnected banking arms supporting said superstructure, at least one of said pairs of banking arms being connected to the superstructure on corresponding inclined banking axes whereby the wheels have a forward and backward component of movement relative to the superstructure during banking movement of the superstructure and including a pair of wheel supported spindles carried by vertically hinged wheel knuckles, a steering knuckle arm for each wheel knuckle, a transverse steering tie rod connecting said steering knuckle arms to maintain the directional control of the wheels in unison, a steering arm for one of said wheel knuckles, and a drag link connecting said steering arm to the superstructure by means of ball and socket joints and disposed relative to the corresponding banking arm to provide a steering control for the spindle during operation of the banking arm, the drag link connection carried by the superstructure being placed in space relative to the drag link connection carried by the steering arm, at a position determined in correlation to the relative movements of the two connections during vertical oscillation and during banking to maintain the directional position of the wheels substantially free from influence by oscillation and banking.

16. In a vehicle having a superstructure and a pair of transversely interconnected banking arms, each banking arm of said pair being connected to the superstructure on an inclined banking axis whereby the wheels have a forward and backward component of movement relative to the superstructure during banking of the superstructure and having a wheel supported spindle carried by a vertically hinged wheel knuckle, a steering arm for said wheel knuckle, a steering gear carried by the superstructure and having a pitman arm, a drag link connected to said steering arm and extending to a control point movably carried by the superstructure and placed in space relative to the steering arm connection at a position determined in correlation to the relative movements of the control point and said connection during vertical oscillation and during banking to maintain the directional position of the wheel substantially free from influence by oscillation and banking, and operating mechanism connecting said pitman arm to said drag link at the control point to effect steering of the wheel by said steering gear.

17. In a vehicle having a superstructure and a pair of transversely interconnected banking arms, each banking arm of said pair being connected to the superstructure on an inclined banking axis whereby the wheels have a forward and backward component of movement relative to the superstructure during banking of the superstructure and having a wheel supported spindle carried by a vertically hinged wheel knuckle, a steering arm for said wheel knuckle, a steering gear carried by the superstructure and having a pitman arm, a drag link connected to said steering arm and extending to a control point movably carried by the superstructure and placed in space relative to the steering arm connection at a position determined in correlation to the relative movements of the control point and said connection during vertical oscillation and during banking to maintain the directional position of the wheel substantially free from influence by oscillation and banking, a lever arm pivotally carried by the superstructure and connected to said drag link at said control point to support and operate the drag link, and a push-pull link connecting said lever arm and said pitman arm to operate said lever arm by the pitman arm and thereby effect steering of the wheel.

18. A vehicle comprising a superstructure, a plurality of pairs of transversely interconnected banking arms supporting said superstructure, at least one of said pairs of banking arms being connected to the superstructure on corresponding inclined banking axes whereby the wheels have a forward and backward component of movement relative to the superstructure during banking movement of the superstructure and including a pair of wheel supported spindles carried by vertically hinged wheel knuckles, a steering gear carried by the superstructure at one side thereof and having a bell crank lever with one arm extending transversely to constitute a pitman arm and the other arm extending longitudinally, a corresponding bell crank lever pivotally carried by the superstructure at the opposite side thereof, a tie rod interconnecting said longitudinally extending arms of said bell crank levers, a steering arm for each of said wheel knuckles, and a drag link connecting each steering arm to the transverse arm of the corresponding bell crank lever by means of ball and socket joints and disposed relative to the corresponding banking arm to provide a steering control for the drive spindle during operation of the banking arm, each drag link connection carried by the corresponding bell crank lever being placed in space relative to the corresponding drag link connection carried by the respective steering arm, at a position determined in correlation to the relative movements of the two connections during vertical oscillation and during banking to maintain the wheels under the directional control of said steering gear at all times.

19. In a vehicle, in combination with a banking arm disposed between a superstructure and the road to turn relative to the superstructure on an inclined banking axis and having a steerable wheel supported spindle carried by a vertically hinged wheel knuckle which has a forward and backward component of movement relative to the superstructure during banking of the superstructure, a steering arm for said wheel knuckle, and a drag link connecting said steering arm to the superstructure by means of universally movable joints and disposed relative to the banking arm to provide a steering control for the spindle during operation of the banking arm, the drag link connection carried by the superstructure being disposed in substantially the same horizontal plane as the drag link connection carried by said steering arm when the banking arm is in its upright non-banked position, and the drag link connection carried by the superstructure being disposed at a point along the neutral steer axis for the banking arm to compensate for the tendency of the banking arm to move the spindle angularly in plan view during banking.

20. A superstructure banking vehicle comprising a superstructure and paired dirigible wheels, a wheel carrier for each of said wheels hingedly connected to the superstructure on an inclined banking axis whereby the wheels have a forward and backward component of movement relative to the superstructure during banking movement of the superstructure, one of said carriers comprising a steering knuckle, a kingpin pivotally connecting said steering knuckle to said carrier, a steering arm fixed to said steering knuckle, a manually operable pitman arm having one end pivoted on the superstructure, a drag link pivoted to the other end of the pitman arm and to the steering arm, a line drawn from the connection between the drag link and steering arm to a selected point on the kingpin axis being parallel in plan view at all times to a corresponding line drawn from the connection between the drag link and pitman arm to a selected point on the banking axis, and said lines being of substantially equal length in plan view when the superstructure is in normal upright non-banking position.

21. A superstructure banking vehicle comprising a superstructure and paired front and rear wheels, a wheel carrier for each of the front wheels connected to the superstructure on an inclined banking axis whereby the wheels have a forward and backward component of movement relative to the superstructure during banking movement of the superstructure, one of said carriers including a steering knuckle, a kingpin pivotally connecting the steering knuckle to said carrier, a steering arm fixed to said steering knuckle, steering gear including a pitman arm having one end rotatably mounted on the superstructure, and a drag link connected to the other end of the pitman arm and to the steering arm by universally movable joints, a line drawn from the joint between the drag link and steering arm to a predetermined selected point on the kingpin axis being parallel in plan view at all times to a corresponding line drawn from the joint between the drag link and pitman arm to a predetermined selected point on the banking axis, and said lines being of substantially equal length in plan view when the superstructure is in normal upright non-banking position.

22. A superstructure banking vehicle comprising a superstructure and paired front and rear wheels, a wheel carrier for each of one pair of wheels connected to the superstructure on an inclined banking axis whereby the wheels have a forward and backward component of movement relative to the superstructure during banking movement of the superstructure, each of said carriers including a steering knuckle and a kingpin pivotally connecting the steering knuckle to said carrier, a steering arm fixed to one of said steering knuckles, steering gear including a pitman arm having one end fixed relative to the superstructure, and a drag link connected to the other end of the pitman arm and to the steering arm by joints, said joints forming with predetermined points on the banking axis and on the kingpin axis substantially a parallelogram in plan view when the superstructure is in normal upright non-banking position, whereby the steering movement of the front wheels is controlled by the steering gear to overcome angular changes caused by the turn of the wheels around the banking axis.

23. In a vehicle having a superstructure and a pair of interconnected dirigible wheels, interconnected wheel carriers for said wheels each including a steering knuckle and a kingpin mounting the associated wheel for steering movement, banking hinges connecting said wheel carriers to the superstructure to permit swinging movement thereof relative to the superstructure, and steering mechanism for said wheels comprising a steering arm fixed to the steering knuckle of one of said wheels and extending inwardly therefrom, a link having a pivotal connection with said steering arm and extending therefrom in a direction in plan view toward the corresponding banking hinge and parallel to a line connecting the corresponding hinge axis and kingpin when the superstructure is in normal upright non-banking position, and a manually operated actuating member connected to said link at a distance in plan view from said pivotal connection substantially equal to the length of said line, whereby said link is moved longitudinally to change the direction of said wheel and may swing about its connection with the actuating member upon movement of the superstructure on said hinges without changing the direction of the wheel.

24. A vehicle comprising a superstructure and a pair of interconnected dirigible wheels, interconnected wheel carriers for said wheels each including a steering knuckle and a kingpin mounting the associated wheel for steering movement, means connecting said wheel carriers to the superstructure on banking axes inclined both laterally and longitudinally of the vehicle to permit swinging movement of the carriers relative to the superstructure, and steering mechanism for one of said wheels comprising a steering arm fixed to the steering knuckle, a link having a pivotal connection with said steering arm and extending therefrom in a direction parallel in plan view to a line connecting the corresponding banking axis and kingpin when the superstructure is in normal upright non-banking position, a steering wheel mounted in the superstructure, and an actuating member controlled thereby and connected to said link at a distance in plan view from said pivotal connection substantially equal to the length of said line, whereby said link may move longitudinally to change the direction of said wheel and may swing with the associated carrier upon movement of the superstructure on said banking axes without changing the direction of said wheel.

25. In a vehicle of the class described, a superstructure, a plurality of pairs of wheels for supporting said superstructure, a banking suspension for said wheels to provide for inward banking of the superstructure on turns, at least one pair of said wheels constituting steerable wheels and being suspended by interconnected wheel carriers pivotally connected to the superstructure in opposed relation to turn on corresponding inclined banking axes whereby the wheels of said pair have a forward and backward component of movement during banking movement of the superstructure, a kingpin for each of said steerable wheels, a knuckle unit for each of said steerable wheels pivotolly carried by the corresponding kingpin, manual steering mechanism including a pitman arm pivotally carried by the superstructure, and means connecting said pitman arm to at least one of said knuckle units to steer the same, said steering knuckle units being connected to operate in unison, and said conections for said steering mechanism being disposed to prevent interference between the banking action of said superstructure and the stering of said steerable wheels.

26. In a vehicle of the class described, a superstructure, a plurality of pairs of wheels for supporting said superstructure, at least one pair of wheels being steerable, a banking suspension for said wheels disposed to provide for inward banking of the superstructure on turns, the banking suspension for said pair of steerable wheels comprising interconnected wheel carriers to provide for independent vertical oscillation of the wheels and pivotally connected to the superstructure in opposed relation to turn on corresponding inclined banking axes in relation thereto whereby the wheels of said pair have a forward and backward component of movement during banking movement of the superstructure, and steering mechanism for said steerable wheels connected to a manually controlled pitman arm pivotally carried by the superstructure, the connection between said steering mechanism and pitman arm being disposed in a neutral zone relative to the movements of said wheels in both vertical oscillation and during banking, to prevent interference with the steering by said oscillation and banking movements.

27. A vehicle comprising a superstructure, a plurality of pairs of transversely interconnected banking arms supporting said superstructure, at least one of said pairs of banking arms being connected to the superstructure on corresponding inclined banking axes whereby the wheels have a forward and backward component of movement relative to the superstructure during banking movement of the superstructure and including a pair of wheel supported spindles carried by vertically hinged wheel knuckles, a steering knuckle arm for each wheel knuckle, a transverse steering tie rod connecting said steering knuckle arms to maintain the directional control of the wheels in unison, a central support arm for said tie rod pivoted to the superstructure to swing with the tie rod during movement of the latter, said steering tie rod being constructed in two sections each extending from a corresponding steering knuckle arm to the central support arm and the connections between said tie rod sections and support arm being spaced in a direction longitudinally of the tie rod a distance correlated to the length of the support arm to provide compensation for changes in the distance between the vertical hinges of the wheel knuckles during banking, a steering arm for one of said wheel knuckles, and a drag link connecting said steering arm to the superstructure by means of ball and socket joints and disposed relative to the corresponding banking arm to provide a steering control for the spindle during operation of the banking arm, the drag link connection carried by the superstructure being placed in space relative to the drag link connection carried by the steering arm, at a position determined in correlation to the relative movement of the two connections during vertical oscillation and during banking to maintain the directional position of the wheels substantially free from influence by oscillation and banking.

28. A vehicle comprising a superstructure, a plurality of pairs of transversely interconnected banking arms supporting said superstructure, each banking arm of at least one pair being connected to the superstructure on an inclined banking axis whereby the outer end of the arm has a forward and backward component of movement relative to the superstructure during banking movement of the superstructure, a rigid axle structure secured to the outer ends of the banking arms of said last named pair, wheel supported spindles carried by vertically hinged wheel knuckles at the opposite ends of said axle, a steering knuckle arm for each wheel knuckle, a transverse steering tie rod connecting said steering knuckle arms to maintain the directional control of the wheels in unison, a steering arm for one of said wheel knuckles, and a drag link connecting said steering arm to the superstructure by means of ball and socket joints and disposed relative to the corresponding banking arm to provide a steering control for the spindle during operation of the banking arm, the drag link connection carried by the superstructure being placed in space relative to the drag link connection carried by the steering arm, at a position determined in correlation to the relative movements of the two connections during vertical oscillation and during banking to maintain the directional position of the wheels substantially free from influence by oscillation and banking.

29. A superstructure banking vehicle comprising a superstructure and paired front and rear wheels, paired front and rear wheel carriers each connected to the superstructure on an inclined banking axis to permit swinging movement of the carrier about its axis whereby the outer end of the carrier has a forward and backward component of movement relative to the superstructure during banking movement of the superstructure, each of one pair of carriers including a steering head and a kingpin pivotally connecting the steering head to the carrier, a steering arm fixed to one of said steering heads, steering mechanism mounted on the superstructure including a member manually moved in the steering operation, and a link connected by joints to said member and to said steering arm said joints being correlated to the banking axis and the kingpin axis to maintain the direction of the associated wheel constant for a given position of said manually movable member during banking of the superstructure.

30. A superstructure banking vehicle comprising a superstructure and a pair of dirigible wheels, a tie rod interconnecting said wheels to transmit angular steering movement therebetween, interconnected wheel carriers for said wheels each including a steering knuckle and a kingpin, at least one of said steering knuckles being shaped as a bell crank having a transversely extending arm, a connection between each wheel carrier and the superstructure forming an inclined axis whereby the steering knuckle has a forward and backward component of movement relative to the superstructure during banking movement of the superstructure, and steering mechanism for said wheels comprising a lever carried by the superstructure, and a drag link having one end pivotally connected to the lever and the other end capable of moving approximately parallel to said arm, said lever being so constructed and arranged as to eliminate any effect on the dirigible wheels other than that caused by said lever.

JOACHIM KOLBE.

REFERENCES CITED

The following references are of record in the file of this patent:

UNITED STATES PATENTS

| Number | Name | Date |
| --- | --- | --- |
| Re. 21,605 | Kolbe | Oct. 22, 1940 |
| 2,234,676 | Kolbe | Mar. 11, 1941 |
| 2,271,505 | Kolbe | Jan. 27, 1942 |
| 2,280,044 | Kolbe | Apr. 14, 1942 |
| 2,341,726 | Kolbe | Feb. 15, 1944 |